Feb. 21, 1950

W. A. EDSON ET AL 2,498,073

MICROWAVE ELECTRICAL TESTING SYSTEM

Filed May 11, 1946

INVENTORS W. A. EDSON
I. G. WILSON
BY
E. V. Griggs
ATTORNEY

Feb. 21, 1950   W. A. EDSON ET AL   2,498,073
MICROWAVE ELECTRICAL TESTING SYSTEM
Filed May 11, 1946                                    2 Sheets-Sheet 2

INVENTORS W. A. EDSON
I. G. WILSON
BY
E. V. Griggs
ATTORNEY

Patented Feb. 21, 1950

2,498,073

UNITED STATES PATENT OFFICE 2,498,073

MICROWAVE ELECTRICAL TESTING SYSTEM

William A. Edson, Atlanta, Ga., and Ira G. Wilson, New York, N. Y., assignors to Bell Telephone Laboratories, Incorporated, New York, N. Y., a corporation of New York Application May 11, 1946, Serial No. 669,046

2 Claims. (Cl. 171—95)

This invention relates to testing equipment and more particularly to apparatus permitting the rapid checking of the performance of object locator systems employing reflected pulses of electromagnetic waves.

An object of the invention is to provide a compact and efficient microwave switch so shielded as to prevent leak in either its open or closed positions from the circuits which it may serve to connect.

Another object of the invention is to provide microwave test equipment which may quickly and conveniently be changed at will from a frequency selective condition to a non-frequency selective condition.

Another object of the invention is to provide detecting apparatus for microwaves which may be invariable in its apparent electrical length while being switched from a selective or tuned input circuit to a non-tuned input circuit and vice versa.

An additional object of the invention is to provide a variable coupler for microwaves which may serve to couple a detector alternately to either a cavity resonator or a coaxial input circuit while maintaining the detector effectively disconnected from the other.

Cavity resonators have many applications in the microwave art. As phantom targets for radio object locators they respond selectively to a pulse of incoming oscillations and upon its cessation yield a protracted train of oscillations from the energy stored up in an internal electromagnetic field. In frequency measuring equipment they may serve in conjunction with a mechanical tuning device and an oscillation detecting and indicating apparatus to measure the frequency of received oscillations with a high degree of accuracy. In all these applications it is desirable to connect and disconnect them from their associated transmission circuits by apparatus which introduces a minimum of energy dissipation or reflection when in transmission or energy pass condition and which entirely removes them from the circuit when in non-transmission condition.

In microwave testing apparatus it is frequently desirable first to connect the oscillation detector and current indicator to an untuned input circuit until the presence of oscillations is established by the indicator and then to introduce in lieu of the untuned circuit a highly selective device such as a variable cavity resonator by means of which the frequency of the oscillations may be ascertained. For this purpose a simple and effective microwave switching system which will establish any of the various circuit conditions at will and, at the same time, permit the oscillation detector to operate under substantially unchanged electrical conditions is especially desirable.

In accordance with the invention an electrical microwave testing system is provided with both a non-selective or untuned input circuit and a selective or tuned circuit including a resonant cavity. The microwave oscillation detector and the detected energy indicator are built into a unitary mechanical structure with one element of a microwave switch which may be brought into effective energy transfer relation with either the untuned input circuit path or with the tuned input path at will.

In one embodiment, the unitary structure may remain stationary while a movable switch or coupling member capable of longitudinal motion carries into energy transfer relation with the unitary structure either the movable coupling member of the untuned input path or the movable coupler of the tuned input circuit.

In the drawing, Fig. 1 illustrates diagrammatically a testing equipment which constitutes one embodiment of the invention;

Figure 1:
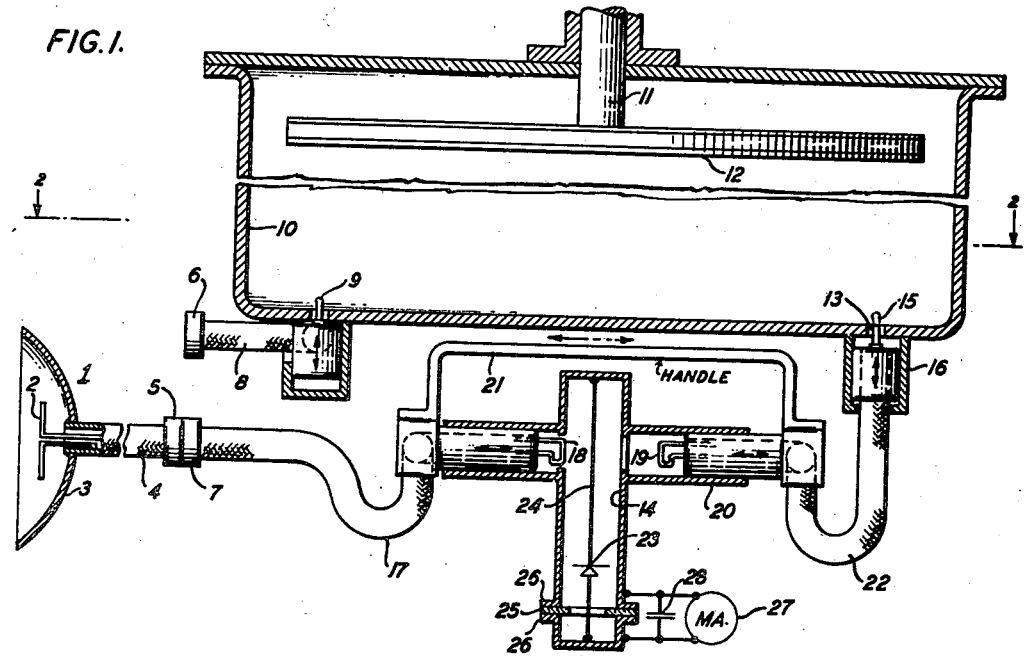

Referring to Fig. 1, a microwave pick-up device 1 which may comprise a dipole 2 associated with a collecting reflector 3 is connected to a coaxial section 4 having a terminal plug 5 which may be inserted either in the jack 6 of a tuned input system or in the jack 7 of an untuned circuit. The tuned input circuit involves a coaxial section 8 coupled by a retractile loop 9 to the internal electromagnetic field of the cavity resonator 10. The tuning of the resonator 10 may be varied at will by a reciprocation of the tuning plunger 11 and the tuning piston 12 to a position at which the resonator responds most strongly to oscillations of the desired frequency. An aperture 13 in the bottom of the resonator 10 enables coupling of the resonator 10 to a detector and indicator coaxial circuit 14 when the coupling loop 15, mounted on a slidable structure capable of longitudinal motion within the enclosing guide 16, is actuated to bring the loop 15 into the dotted position shown in Fig. 1. In that position the loop 15 projects slightly into the internal electromagnetic field of the resonator 10. The untuned input circuit comprising the jack 7, and the coaxial section 17 terminates in a slidable coupling loop 18 which, like a similar slidable loop 19, is mounted in a guided block located within the shielded casing 20 of the coupling and switching structure. The guide blocks carrying the loops 18 and 19 are slidably mounted within portions of the shielded casing 20 in such manner that they may be made to approach or recede from apertures opening into the coaxial indicator circuit 14 so as to be effectively coupled with or effectively uncoupled from that circuit. In the condition shown in Fig. 1 the loop 18 of the untuned circuit is in such position as to be effectively coupled with the circuit 14 and the loop 19 of the tuned circuit is substantially wholly uncoupled from the circuit 14. The guide blocks are mechanically operated by handle 21 so that with the handle at its extreme right position, as shown in Fig. 1, the microwave pick-up device 1 is connected through the untuned input circuit 17 and loop 18 with the detector and indicator circuit 14. When, however, the plug 5 is inserted in jack 6 and handle 21 is moved to the left the microwave pick-up device will be connected by way of circuit 8, loop 9, the resonator 10, loop 15, coaxial conductor 22 and loop 19, these connections constituting a tuned input circuit because of the selective characteristics of resonator 10, to the detector and indicator circuit 14. It will be understood, of course, that in this position the guide blocks carrying the retractile loops 9 and 15 are in their uppermost positions so as to enable the retractile loops to be effectively coupled to the electromagnetic field within resonator 10.

As shown, the coaxial circuit 14 includes a detector or rectifier 23 of any preferred type intercalated in series in the central conductor 24. An apertured disc 25 of dielectric material is interposed between closely adjacent flanges 26 of the outer conductor of the coaxial circuit to constitute with the flanges 26 a blocking capacitor for rectified current which is constrained to pass to the milliammeter 27, the blocking capacitor presenting negligible impedance in circuit 14 to high frequency currents of the oscillation frequency. An integrating or smoothing condenser 28 is provided in shunt to the milliammeter 27 in well-known manner.

The coaxial circuit 14, 24 is of approximately a half wavelength. Accordingly, circuit 14, 24 presents a very low impedance. Because of the low impedance of the half wavelength coaxial section, the electromotive force induced in the central conductor 24 by the input loop 18 or 19, as the case may be, is expended primarily across the terminals of the detector 23. The unidirectional current produced as the result of the rectifying action of the detector 23 passes to the milliammeter 27 which accordingly provides a convenient and sensitive means for indicating the intensity of the oscillations supplied by the coupling loop 18 or 19. The relatively large integrating condenser 28 having a capacitance of the order of a microfarad serves to smooth the current to the meter 27 in case the high frequency energy is supplied in the form of intermittent pulses. Inasmuch as the input impedance of the detector 23 is not a pure resistance it is desirable to compensate for its reactive component. This may be done by modifying the length of the coaxial structure from the half wavelength so as to obtain the effect of either an inductive or a capacitative reactance in series with the detector. In this manner it is possible to obtain the full resonance electromotive force for application to the detector 23 and, accordingly, to improve the sensitivity of the device or to increase the constancy of the sensitivity with respect to frequency.

Figure 2:
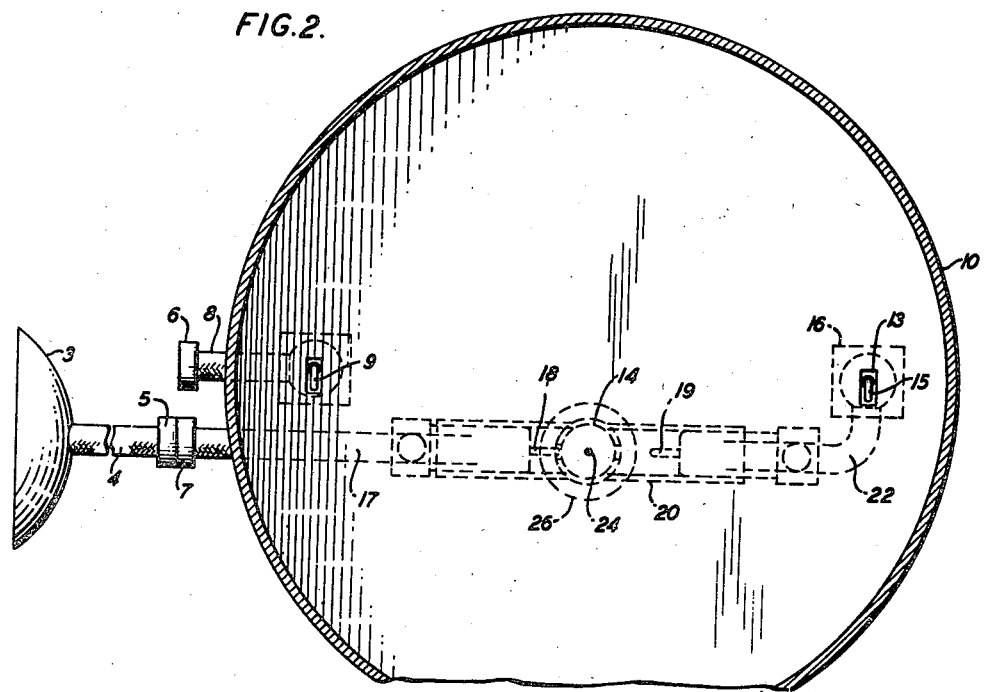
Fig. 2 is a section along the plane 2—2 of the structure shown in Fig. 1.

As indicated diagrammatically in Fig. 2, the principal planes of the loops 9 and 15 are in a tangential direction with respect to the circular electric field by $TE_{0mn}$ oscillations. This makes for an effective coupling with fields of that type and serves to minimize couplings to fields of other undesired modes of oscillation.

Figure 3:
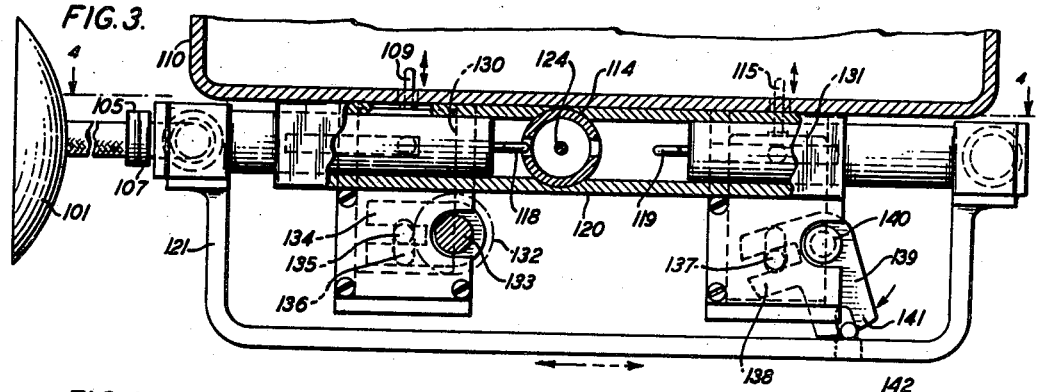
Fig. 3 is a vertical section of a detector indicator apparatus which differs somewhat from that shown diagrammatically in Fig. 1.

The disclosure of Figs. 1 and 2 is of diagrammatic character in order to illustrate the principles of the invention. A preferred embodiment which is electrically the equivalent but which permits the structure to be made much more compact and convenient to operate is disclosed in Figs. 3, 4 and 5. In the apparatus of these figures a microwave pick-up system 101 and the cavity resonator 110 may be identical with the microwave pick-up 1 and cavity resonator 10 respectively of Fig. 1. The reciprocating structure including the handle 121 and the slidable loops 118 and 119 are identical with the corresponding elements of Fig. 1 except that the loops lie in a horizontal plane perpendicular to the paper. This permits the coaxial section 114, 124 to be placed in a horizontal position parallel and very closely adjacent to the bottom of the cavity resonator 110 instead of in the perpendicular position indicated in the diagram of Fig. 1. The shielded casing 120 may accordingly be attached directly to the bottom of the cavity resonator. To the rear of the casing 120, as viewed in Fig. 3, are enclosing guides 116 also attached to the underside of the cavity resonator 110. Within the guides 116 are movable guide blocks 130 and 131 which are movable in a vertical direction to bring the loops 109 and 115 into coupling relation with the interior electromagnetic field of the resonator 110, as shown in the case of loop 109 in Fig. 3 or out of coupling relation therewith as shown in the case of loop 115. The loop 109 is adjusted in position by means of knob 132, shaft 133 and the yoke 134 carried by shaft 133 astride the pin 135 projecting from the guide block 130. Rotation of the knob 132 with corresponding rotation of the yoke 134 carries the pin 135 and its associated guide block 130 in a vertical direction, the pin being free to slide vertically in a slot 136. The loop 115 and the guide block 131 upon which it is mounted are similarly reciprocated by means of a pin 137 projecting from the guide block 131 and operated by a yoke 138 which constitutes one arm of a bell crank 139 pivotally mounted at 140, the other arm of the bell crank comprising a similar yoke 141 operated by a projection 142 integral and extending upwardly from the reciprocating handle 121. It follows that when the handle 121 is moved to the right to bring the coupling loop 118 into coupling engagement with the coaxial section, the bell crank 139 is rotated in counter-clockwise direction to withdraw loop 115 from the interior of the cavity resonator 110 into the position in which it is shown in full line in Fig. 3. At the same time the reciprocating mechanism carries the loop 119 to a position remote from the coaxial section.

Conversely, displacement of the handle 121 toward the left upcouples the loop 118 and couples the loop 119 to the coaxial section and simultaneously moves the loop 115 into coupling position with the interior electromagnetic field of resonator 110 and the loop 119 into coupling with the coaxial section 114, 124. In this latter or tuned input position the operator will, of course, rotate the knob 132 to uncouple the loop 109 from the cavity resonator and will transfer block 105 from jack 107 to jack 106.

Figure 4:
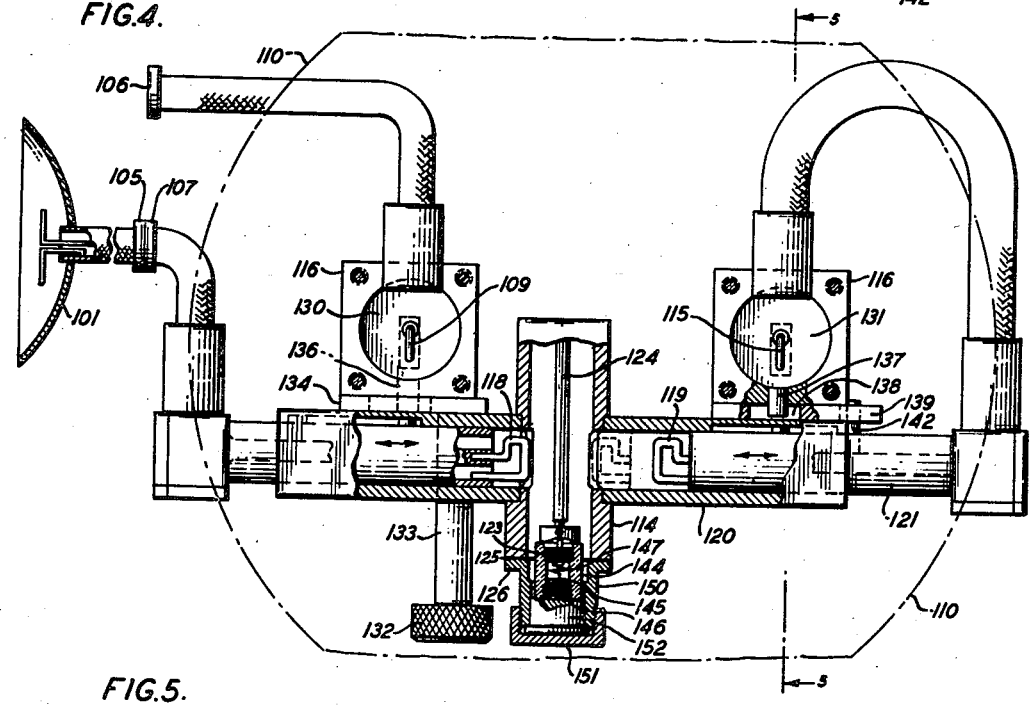
Fig. 4 is a plan view of the coupler and switching unit of Fig. 3 viewed from the plane 4—4 of Fig. 3 and with portions broken away to disclose the internal structure.
Figure 5:
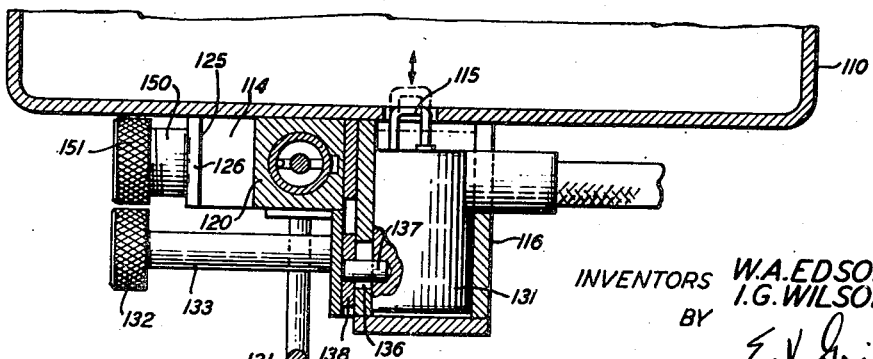
Fig. 5 is a vertical section of the structure of Fig. 4 along the vertical plane 5—5 viewed in the direction of the arrows.

The details of the detector 123 are illustrated in Fig. 4 in which a portion of the vitreous cylinder 144 is broken away to show the minute crystal plate 145, for example, of silicon, seated on the metal base plug 146 and in contact with a spring-pressed metallic point 147 of the cat-whisker type. The insulating disc 125 electrically separating the 126 flange of the metallic sleeve 150 from the outer coaxial member 114 is secured mechanically to the member 114 by insulating mechanical connections, not shown. A metal cap 151 is attached by a screw-threaded connection to the end of sleeve 150 and serves the double purpose of excluding dust and moisture from the coaxial section 114, 124 and of completing the electric circuit through the circular block 152 which is gripped firmly between the cap 151 and the base member on which the detector plate 145 is mounted. The detector cartridge consisting of the tubular insulating member 144, its terminal blocks and enclosed detector, is accordingly held firmly with its central axis in longitudinal alignment of the inner conductor 124.

It will be apparent that the structure which has been disclosed provides a stable fixed mounting for the sensitive crystal detector, together with a convenient switching mechanism for connecting the pick-up antenna to the detector either through the tuned input system including the resonant chamber or through the untuned input system. It is, therefore, possible to quickly ascertain the presence of microwave oscillations of a frequency within the range of the resonator by first using the untuned input system. After the presence of such microwave has been ascertained the apparatus may be quickly and easily switched to the tuned input circuit to permit determination of the size wavelength by manipulation of the tuning piston in well-known manner.

The apparatus described is very useful as a wave meter for microwaves. It may also serve with the pick-up system connected to the tuned input and with the handle 121 in its extreme position to the left to uncouple the loop 115 and with the shaft 133 rotated in counter-clockwise position to disconnect the loop 109 as an echo box for receiving pulses of microwave energy and reradiating the energy over the pick-up antenna after the incoming pulse has terminated.

What is claimed is:

1. A microwave detecting system comprising a closed hollow casing of electrically conductive material, a fixed coupling element mounted therein, a detector connected to the coupling element and a meter connected to the detector and a pair of movable coupling elements also mounted in said casing for simultaneously reciprocating motion therein and means for moving said movable elements to bring one or the other selectively into energy transfer relation with the fixed coupling element.

2. A microwave detecting system comprising a closed hollow casing of electrical conductive material, a fixed coupling loop mounted therein, a detector connected to the terminals of the loop and a meter connected to the detector, a pair of movable coupling loops also mounted within the casing and mechanically connected, a pair of relatively widely separated movable loops also mounted in the casing for joint reciprocating motion therein and means for moving said movable loops to bring one or the other selectively into energy transfer relation with the fixed loop.

WILLIAM A. EDSON.
IRA G. WILSON.

REFERENCES CITED

The following references are of record in the file of this patent:

UNITED STATES PATENTS

| Number | Name | Date |
|---|---|---|
| 2,235,010 | Chaffee | Mar. 18, 1941 |
| 2,281,274 | Dallenbach | Apr. 28, 1942 |
| 2,283,895 | Mouromtseff et al. | May 19, 1942 |
| 2,311,520 | Clifford | Feb. 16, 1943 |
| 2,350,907 | Kroger | June 6, 1944 |
| 2,405,814 | Brannin | Aug. 13, 1946 |
| 2,411,553 | Ramo | Nov. 26, 1946 |
| 2,414,456 | Edson | Jan. 21, 1947 |
| 2,422,601 | Tashjian | June 17, 1947 |